United States Patent [19]
Mintgen

[11] Patent Number: 5,042,782
[45] Date of Patent: Aug. 27, 1991

[54] FLUID SPRING

[75] Inventor: Rolf Mintgen, Thür, Fed. Rep. of Germany

[73] Assignee: Stabilus GmbH, Koblenz-Neuendorf, Fed. Rep. of Germany

[21] Appl. No.: 370,693

[22] Filed: Jun. 22, 1989

[30] Foreign Application Priority Data

Jun. 23, 1988 [DE] Fed. Rep. of Germany ....... 3821147

[51] Int. Cl.$^5$ .............................. F16F 9/02
[52] U.S. Cl. ................ 267/64.28; 267/64.17; 267/113
[58] Field of Search ............. 267/64.28, 64.17, 113, 267/64.15, 64.16; 188/322.21, 284; 251/63

[56] References Cited

U.S. PATENT DOCUMENTS

| | | | |
|---|---|---|---|
| 1,142,194 | 6/1915 | Morgan | 251/63 X |
| 2,892,625 | 6/1959 | Hartel | 267/64.28 |
| 3,658,313 | 4/1972 | Hahn | 267/64.17 |
| 3,694,111 | 9/1972 | Braun | 267/64.28 |
| 4,678,203 | 7/1987 | Röhner et al. | 267/64.28 |
| 4,721,289 | 1/1988 | Hennells | 267/64.28 |
| 4,826,141 | 5/1989 | Buma et al. | 267/64.28 |

FOREIGN PATENT DOCUMENTS 1282364 7/1964 Fed. Rep. of Germany .

Primary Examiner—Matthew C. Graham
Attorney, Agent, or Firm—Brumbaugh, Graves, Donohue & Raymond

[57] ABSTRACT

In a gas spring having two working chambers, a pressurized gas is provided within both the working chambers. One of the working chambers is connected with a pressure reservoir. A shut-off valve is provided between the pressure reservoir and the respective working chamber and is automatically controlled such as to admit pressurized gas from the reservoir to the respective chamber when the pressure value within the respective working chamber falls below a predetermined pressure value. The shut-off valve is closed again when the pressure within the respective working chamber has risen again up to a determined pressure. Accordingly, the pressure within the working chambers does not fall below the predetermined value as long as the increased pressure within the reservoir exists.

16 Claims, 2 Drawing Sheets

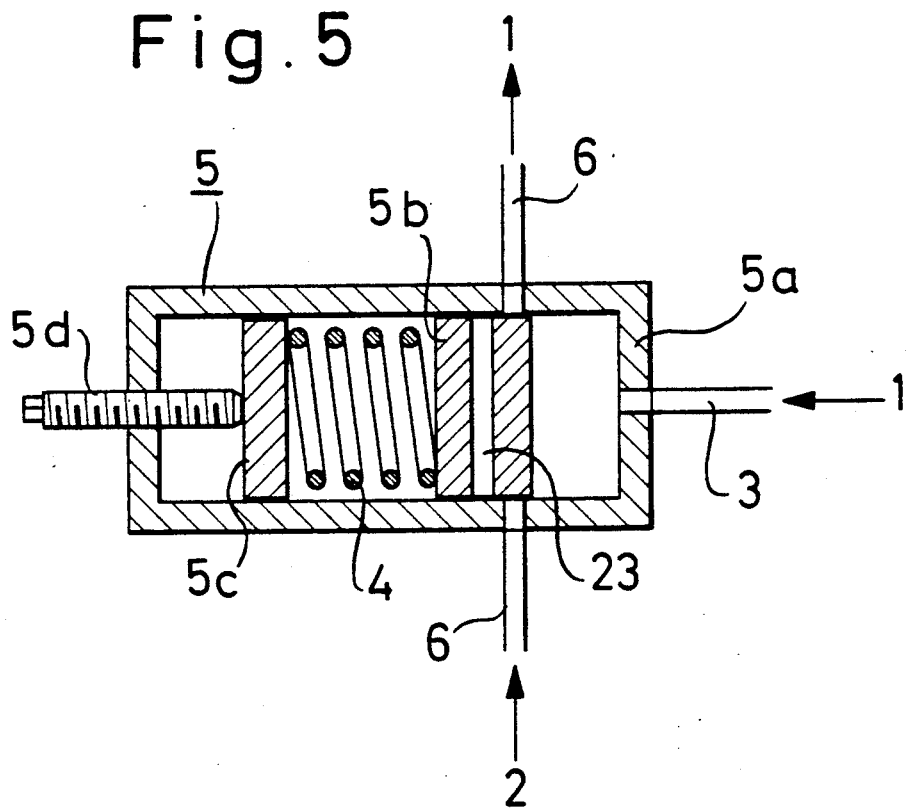

FLUID SPRING

BACKGROUND OF THE INVENTION

The invention relates to a fluid spring.

The spring action of such a fluid spring should remain nearly constant over a long period of operation. However, it occurs sometimes that pressurized fluid escapes through the sealing means through which the piston rod passes. In order to nevertheless maintain a nearly constant pressure within the cylinder, compensating means are provided which allow a correction of the pressure acting on the piston rod.

STATEMENT OF THE PRIOR ART

A gas spring which comprises a pressure reservoir connectable with the working chamber through a shut-off valve is known from German Patent 1,282,364. To vary the outward thrust force of the piston rod the shut-off valve is opened by the piston rod when the piston rod is fully pushed inwards, so that the connection of the working chamber with the pressure reservoir having a higher gas pressure is effected by such valve actuation. The valve actuation is dependent upon the piston rod stroke. It is disadvantageous that such a pressure correction in the working chamber cannot be effected in a sufficiently sensitive manner, and it is further disadvantageous that the correction of pressure can be effected only in a definite position of the piston rod which must be achieved by an external force acting on the piston rod.

OBJECT OF THE INVENTION

It is the object of the invention to provide a fluid spring in which the pressure of the pressurized fluid chamber can be automatically corrected independent of the respective position of the piston rod. A further object of the invention is to provide correction means which allow a very sensitive correction of the pressure of the pressurized fluid.

SUMMARY OF THE INVENTION

A fluid spring comprises a container and a plunger member movable with respect to said container. At least one fluid chamber is defined within said container. This fluid chamber contains a volume of pressurized fluid. The volume of pressurized fluid exerts a force onto said plunger member. The fluid chamber is in fluid flow connection with a reservoir of pressurized fluid, the pressure of pressurized fluid within said reservoir being larger than the pressure of pressurized fluid within the fluid chamber. A shut-off valve is provided in the fluid flow connection between the fluid chamber and the reservoir. This shut-off valve is continuously controlled by a signal representing a first predetermined pressure value of the pressurized fluid within the fluid chamber and by a signal representing the actual value of pressure of the pressurized fluid within the fluid chamber. The shut-off valve is opened when the actual value of pressure within the fluid chamber falls below the first predetermined pressure value and is closed when the actual value of the pressure within the fluid chamber approaches the first predetermined pressure value.

By this design of the fluid spring, the pressure within the fluid chamber cannot fall below the first predetermined pressure value as long as the increased pressure within the pressure reservoir exists. Such a nearly constant thrust force on the plunger is guaranteed over a long period of operation. No external influence must be exerted in order to maintain the substantially constant pressure and the substantially constant force acting on the plunger member.

According to a further development of the invention the fluid chamber is connected with atmosphere through a further shut-off valve. This further shut-off valve is controlled by a signal representing a second predetermined pressure value of the pressure within the fluid chamber and by a signal representing the actual value of pressure within the fluid chamber. This further shut-off valve is opened when the actual value of pressure within the fluid chamber raises beyond the second predetermined value of pressure. It is closed again when the actual value of pressure within the fluid chamber approaches the second predetermined pressure value.

By this further development it is achieved that the pressure within the fluid chamber cannot rise beyond the second predetermined value of pressure. It is evident that the constancy of the pressure within the fluid chamber is at an optimum if the second predetermined pressure value is close to the first predetermined pressure value.

If the pressure within the fluid chamber is substantially independent of the relative position of the container and the plunger member, the second predetermined value of pressure may be substantially equal to the first predetermined value of pressure.

In most cases it is sufficient if the pressure within the fluid member is maintained within a predetermined range of pressure values. Such, the second predetermined value of pressure may be larger than the first predetermined value of pressure. With such a design, the shut-off valve and—as the case may be—the further shut-off valve—are opened only when the limits of the range are exceeded. So there is no risk that the pressurized fluid in the pressure reservoir is exhausted too early.

If the actual pressure within the fluid chamber is dependent on the position of the plunger member with respect to the container, and if the plunger member is movable between two terminal positions with respect to the container, the movement of the plunger member between the two terminal positions results in a difference of the actual values of pressure. In this case the difference of the second predetermined value of pressure and the first predetermined value of pressure should be at least equal to the above-mentioned difference of actual values of pressure.

By this condition it is guaranteed that the correction of the pressure within the fluid chamber is suppressed as long as only pressure variations occur in response to the movement of the plunger between its terminal positions. Such a too early exhaust of the pressure reservoir is again avoided.

The signal representing the first predetermined pressure value may be adjustable, and also the signal representing the second predetermined pressure value may be adjustable. According to a very economic and simple embodiment the shut-off valve comprises a valve member. The valve member opens and closes the fluid flow connection in response to its position. The valve member is subject to the action of an elastic element on the one hand and to the actual pressure within the fluid chamber on the other hand. The spring force of the elastic element provides the signal representing the first predetermined pressure value.

An analogous design may be used for the further shut-off valve.

The pressure reservoir and the shut-off valve may be integrated with the fluid spring, such that a very compact unit is obtained, e.g. the pressure reservoir and the shut-off valve may be integrated with the container of the fluid spring or alternatively with the plunger member.

It is however also possible that the fluid spring and the reservoir are separated from each other and are interconnected by an external fluid flow connection line.

The fluid spring may be a gas spring in which case the pressurized fluid within the container comprises a volume of pressurized gas.

The pressure within the reservoir may be maintained in that the pressurized fluid within the reservoir comprises also a volume of pressurized gas.

According to a preferred embodiment both the container and the reservoir contain a volume of pressurized gas, and these volumes of pressurized gas are interconnected by the fluid flow connection.

The fluid spring may be designed in the style of a conventional gas spring; in such case the container is a cylinder having an axis and two ends and defining a cavity therein. A piston rod guiding and sealing unit is provided adjacent one of the two ends. The plunger member is a piston rod member extending inwards and outwards of the cavity. A piston unit is connected with the piston rod member within the cavity. The piston unit separates the cavity into two working chambers. The working chambers are interconnected across the piston unit. Both working chambers contain a pressurized fluid. The pressurized fluid in at least one of the working chambers comprises a volume of pressurized gas.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereinafter with reference to the embodiments shown in the accompanying drawings in which:

FIG. 5 shows by way of example a valve unit to be used as said shut-off valve or as said further shut-off valve.

DESCRIPTION OF THE PREFERRED EMBODIMENTS

Figure 1:
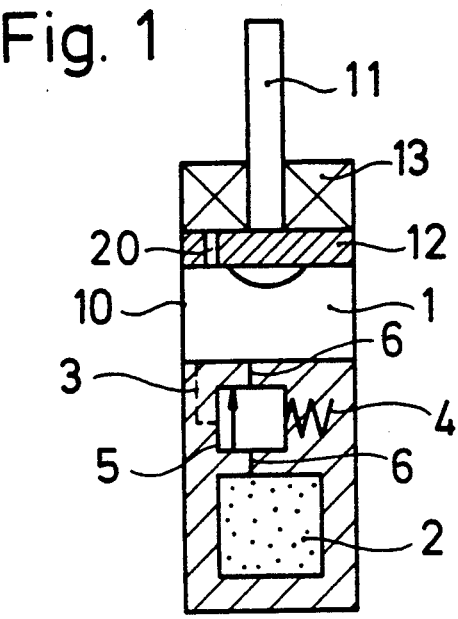
FIG. 1 shows a gas spring with a reservoir integrated within the container.

The gas spring according to FIG. 1 possesses a cylinder 10 in which there slides a piston 12 connected with a piston rod 11. A piston rod guiding and sealing unit 13 is provided at the upper end of the cylinder 10 and seals off to the exterior. A cavity 1 is situated in the interior of the cylinder 10. This working chamber 1 possesses a gas filling under pressure, whereby the piston rod 11 is subject to an outward thrust force. The outward thrust force here corresponds to the product of the pressure in the cavity 1 and the cross-sectional area of the piston rod 11. Likewise in the cylinder 10 a pressure reservoir 2 is provided adjoining the cavity 1 and is connectable with the cavity 1 by way of a pressure-dependently acting valve 5. There is a higher gas pressure in the pressure reservoir 2 than in the cavity 1, so that when the pressure reservoir 2 is connected with the cavity 1 through the pressure-dependently acting valve 5, gas flows out of the pressure reservoir 2 into the cavity 1. The pressure-dependently acting valve 5 comprises a valve body which is loaded for the one part, through a control conduit 3 connected with the cavity 1, by the pressure in the cavity 1 and for the other part by a spring element 4. By means of the pre-stress of the spring element 4 the pressure-dependently acting valve 5 can be adjusted to a predetermined pressure to be maintained in the cavity 1. If the actual pressure in the cavity 1 falls below the predetermined pressure, the displacement of the valve body by the spring element 4 has the effect that the pressure reservoir 2 is connected with the cavity 1 until the predetermined pressure is reached again in the cavity 1 and the pressure-dependently acting valve 5 closes the connection again. Thus by means of the pressure-dependently acting valve 5 the pressure in the cavity 1 and thus the outward thrust force of the piston rod 11 can be kept constant, at least as long as a higher pressure prevails in the pressure reservoir 2 than in the cavity 1. Slight pressure losses in the cavity 1, which occur for example due to escape of gas by way of the piston rod sealing and guiding unit 13, can thus be readily compensated. The pressure-dependently acting valve 5 thus operates in dependence on the actual pressure in the cavity 1. The connection between the reservoir 2 and the cavity 1 is generally opened when the piston 12 and the piston rod 11 are in the outermost position as shown in FIG. 1 because the pressure in the cavity 1 falls when the piston rod 11 moves outwards due to increasing volume within the cavity 1.

Figure 2:
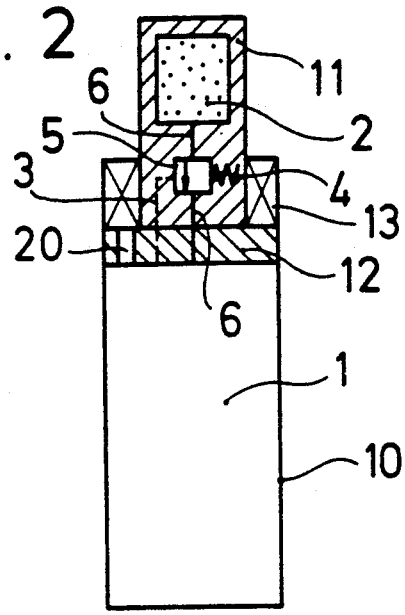
FIG. 2 shows an embodiment in which the reservoir is integrated within the plunger.

The form of embodiment according to FIG. 2 differs from that according to FIG. 1 essentially in that the pressure reservoir 2 is arranged in the piston rod 11. The pressure-dependently acting valve 5 is likewise provided in the piston rod 11, which valve is arranged in the connecting conduit between the pressure reservoir 2 and the cavity 1 and is loaded for the one part by the control conduit 3 and for the other by the spring element 4. If the pressure in the cavity 1 falls below the predetermined pressure, the pressure-dependently acting valve 5 opens, so that gas can flow out of the pressure reservoir 2 into the cavity 1 until the predetermined internal pressure is restored. When the predetermined pressure is reached in the cavity 1, the pressure-dependently acting valve 5 closes the connection to the pressure reservoir 2. The fluid flow connection containing the valve 5 is designated by 6 both in FIG. 1 and 2. It is further to be noted that both in FIG. 1 and 2 the piston 12 is provided with a bore 20 interconnecting respective working chambers on both sides of the piston 12.

Figure 3:
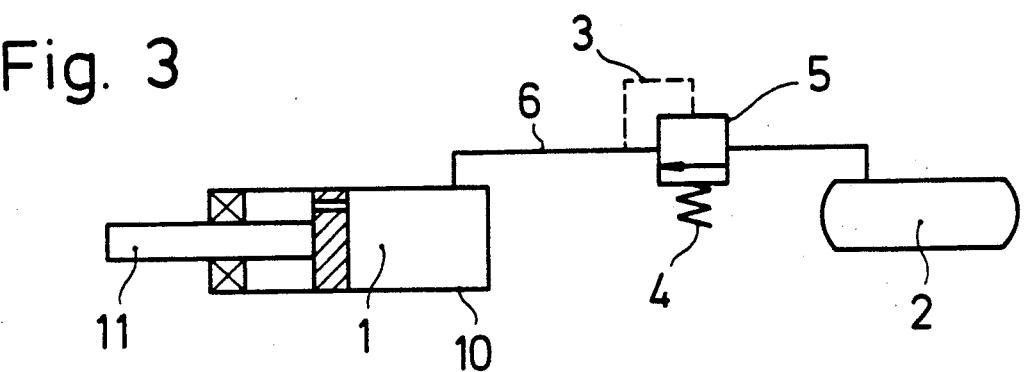
FIG. 3 shows an embodiment in which the reservoir is bodily separated from the container and is connected with the container through a connection line.

In the form of embodiment according to FIG. 3 the pressure reservoir 2 is arranged outside the gas spring, that is outside the cylinder 10 and outside the piston rod 11. The cavity 1 situated in the cylinder 10 is in communication through a connecting conduit 6 and the pressure-dependently acting valve 5 with the pressure reservoir 2, with the pressure in the cavity 1 acting through the control conduit 3 upon the pressure dependently acting valve 5 and for the other part the pre-stressed spring element 4 serving for the exact setting of the pre-determined internal pressure in the cavity 1.

Figure 4:
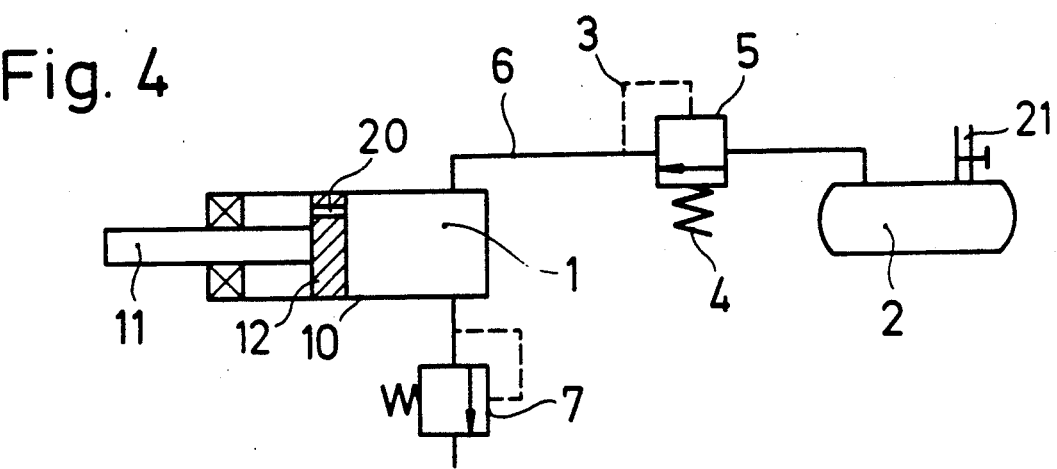
FIG. 4 shows an embodiment corresponding to FIG. 3 in which the container is connectable with atmosphere through a further shut-off valve.

In order to achieve a constant outward thrust force of the piston rod 11 especially even in such installation situations where the gas spring is subjected to great temperature fluctuations, in the example of embodiment according to FIG. 4 a further pressure-limiting valve 7 is provided which is connected to the cavity 1. Thus in this example of embodiment the gas quantity replenished from the pressure reservoir 2 into the cavity 1 as a result of temperature drop can flow away to atmosphere through the pressure-limiting valve 7 if the temperature rises again, so that the same outward thrust force is always exerted upon the piston rod 11. The pressure-limiting valve 7 corresponds in construction to the pressure-dependently acting valve 5, that is here again an adjustable spring element is provided which constitutes the connection to atmosphere on exceeding the predetermined pressure in the cavity 1.

It is readily possible to provide the pressure reservoir 2 with a filling valve 21 so that a simple replenishment of the pressure reservoir 2 is possible. The design according to the invention is suitable especially in the case of small gas spring dimensions in which the cavity 1 is likewise small such that slight gas losses would have a serious effect upon the outward force of the piston rod 11.

In FIG. 5 there is shown the pressure-dependently acting valve 5 in more detail. This valve comprises a valve cylinder 5a and a valve member 5b. The spring element 4 acts on the one side of the valve member 5b. The spring element 4 is supported by a wall member 5c which is again supported by an adjustable spindle 5d. The other side of the valve member 5b is subject to the pressure within the cavity 1 through line 3. The valve member 5b is to selectively close or shut-off the line 6 which extends from the pressure reservoir 2 to the cavity 1.

The predetermined pressure value to be maintained within the cavity 1 is adjusted by adjustment of the spindle 5d which spindle is responsible for the pre-stress of the spring element 4. As long as the predetermined pressure value exists within the cavity 1, the line 6 is shut off. If the actual value within the cavity 1 falls below the predetermined value, the bore 23 within the valve member 5b enters into alignment with the line 6 so that pressurized gas flows from the pressure reservoir 2 into the cavity 1. So the actual value of pressure within the cavity 1 is increased again and the valve member 5b is moved to the left again in FIG. 5 so that the line 6 is shut off again.

The embodiment of the valve 7 in FIG. 4 may be identical with the wall 5 as shown in FIG. 5. However, the valve 5 and 7 in the case of FIG. 4 are adjusted to different predetermined values. In such case the operation in FIG. 4 is as follows: if the actual pressure within the cavity 1 is close above the predetermined pressure value of the valve 5 and the piston rod 11 is moved to the left, the actual pressure value within the cavity 1 is reduced below the predetermined value of pressure as defined by the valve 5. So the valve 5 is opened and additional gas under pressure enters into the cavity 1 until the actual value of pressure within the cavity 1 increases again up to the predetermined value defined by the valve 5. When the piston rod 11 is hereupon moved to the right again in FIG. 4, the pressure within the cavity 1 is increased again. The predetermined value defined by the valve 7 is however such that the piston rod 11 can be moved to the right in FIG. 4 until the piston 12 abuts the right hand end of the cylinder 10 without the predetermined pressure value defined by the valve 7 being reached. Only when an additional increase of the pressure within the cavity 1 occurs, e.g. by raising temperature, the predetermined value of valve 7 is reached and in this case the valve 7 opens and a part of the pressurized gas of the cavity 1 can escape to atmosphere, so the pressure within the cavity 1 is maintained continuously between the lower predetermined pressure defined by the valve 5 and the higher predetermined pressure as defined by the valve 7. Preferably, the difference between the lower predetermined pressure value as defined by the valve 5 and the higher predetermined pressure value as defined by the valve 7 is at least equal to the pressure difference resulting from the movement of the piston rod 11 between its outermost left position in FIG. 4 and its innermost right position in FIG. 4.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. A fluid spring comprising a container (10) and a plunger member (11) movable with respect to said container (10), at least one fluid chamber (1) being defined within said container (10), said at least one fluid chamber (1) containing a volume of pressurized fluid, said volume of pressurized fluid exerting a force onto said plunger member (11), said at least one fluid chamber (1) being in fluid flow connection with a reservoir (2) of pressurized fluid, the pressure of pressurized fluid within said reservoir (2) being larger than the pressure of pressurized fluid within said at least one fluid chamber (1), shut-off valve means (4, 5) in said fluid flow connection (6) between said at least one fluid chamber (1) and said reservoir (2) for opening when the actual value of the pressure within said at least one fluid chamber (1) falls below a first predetermined pressure value and closing when the actual value of said pressure within said at least one fluid chamber (1) approaches said first predetermined pressure value, said opening and closing of said shut-off valve means being independent of the pressure within said reservoir (2), with said shut-off valve means (3, 5) comprising a valve member (5b), said valve member (5b) opening and closing said fluid flow connection (6) in response to its position, the position of said valve member (5b) being responsive to the action of resilient means (4) and to the actual pressure within said at least one fluid chamber (1), with the resilient force of said resilient means (4) determining said first predetermined pressure value.

2. A fluid spring as set forth in claim 1, said at least one fluid chamber (1) being connected with atmosphere through a further shut-off valve means (7), said further shut-off valve means (7) being operable to open when the actual value of pressure within said at least one fluid chamber (1) raises beyond a second predetermined value of pressure and to close when said actual value of pressure within said at least one fluid chamber (1) approaches said second predetermined pressure value.

3. A fluid spring as set forth in claim 2, said second predetermined value of pressure being substantially equal to said first predetermined value of pressure.

4. A fluid spring as set forth in claim 2, wherein said further shut-off valve means (7) includes means (5d) for adjusting said second predetermined pressure value.

5. A fluid spring as set forth in claim 2, said further shut-off valve means (7) comprising a valve member, said valve member opening and closing said at least one fluid chamber (1) with respect to atmosphere in response to its position, said valve member being subject to the action of said resilient means (4) and to the actual pressure within said at least one fluid chamber (1), with the response to its position, said valve member being subject to the action of said resilient means (4) and to the actual pressure within said at least one fluid chamber (1), with the resilient force of said resilient means determining said second predetermined pressure value.

6. A fluid spring as set forth in claim 2, said second predetermined value of pressure being larger than said first predetermined value of pressure.

7. A fluid spring as set forth in claim 6, said actual pressure within said at least one fluid chamber (1) being dependent on the position of said plunger member (11) with respect to said container (10), said plunger member (11) being movable between two terminal positions with respect to said container (10), movement of said plunger member (11) between said two terminal positions resulting in a difference of the actual values of pressure, the difference of said second predetermined value of pressure and said first predetermined value of pressure being at least equal to said difference of actual values of pressure.

8. A fluid spring as set forth in claim 1, wherein said shut-off valve means (3, 5) includes means (5d) for adjusting said first predetermined pressure value.

9. A fluid spring as set forth in claim 1, said container (10) being a cylinder having an axis and two ends and defining a cavity (1) therein, a piston rod guiding and sealing unit (13) being provided adjacent one of said ends, said plunger member (11) being a piston rod member extending inwards and outwards of said cavity (1), a piston unit (12) being connected with said piston rod member (11) within said cavity (1), said piston unit (12) separating said cavity (1) into two working chambers, said working chambers being interconnected across said piston unit (12), both said working chambers containing a pressurized fluid, the pressurized fluid in at least one of said working chambers comprising a volume of pressurized gas.

10. A fluid spring as set forth in claim 1, said pressure reservoir (2) and said shut-off valve means (3, 5) being integrated with said fluid spring.

11. A fluid spring as set forth in claim 10, said pressure reservoir (2) and said shut-off valve means (3, 5) being integrated with said container (10) of said fluid spring.

12. A fluid spring as set forth in claim 10, said pressure reservoir (2) and said shut-off valve means (3, 5) being integrated with said plunger member (11).

13. A fluid spring as set forth in claim 1 said fluid spring and said reservoir (2) being separated from each other and being interconnected by an external fluid flow connection line (6).

14. A fluid spring as set forth in claim 1, said pressurized fluid within said container (10) comprising a volume of pressurized gas.

15. A fluid spring as set forth in claim 1, said pressurized fluid within said reservoir (2) comprising a volume of pressurized gas.

16. A fluid spring as set forth in claim 1, both said container (10) and said reservoir (2) containing a volume of pressurized gas, said volumes of pressurized gas being interconnected by said fluid flow connection (6).

* * * * *

UNITED STATES PATENT AND TRADEMARK OFFICE
CERTIFICATE OF CORRECTION

PATENT NO.   : 5,042,782
DATED        : August 27, 1991
INVENTOR(S)  : Rolf Mintgen It is certified that error appears in the above-identified patent and that said Letters Patent is hereby corrected as shown below:

Title page, under References Cited, the following references should be included:
    U.S. No. 4,662,616        5/5/87  Hennells
    U.S. No. 3,570,832        3/16/71 Ortheil
    German No. DE 3 740 669
    French No. FR 381,005
    SOVIET INVENTIONS ILLUSTRATED, week 84/09, section P,Q:
      General/Mechanical, abstract No. 84-055112/09, Derwent
      Publications Ltd., London, GB; & SU-A-1015 154 (FORGE
      PRESS EQUIP.) 30-04-1983 (Abstract; figure)
Col. 4, line 41, "the" should read --their--;
Col. 6, line 47, "(4,5)" should read --(3,5)--.

Signed and Sealed this

Sixteenth Day of March, 1993

Attest:

STEPHEN G. KUNIN

*Attesting Officer*        *Acting Commissioner of Patents and Trademarks*